(12) United States Patent
Hara et al.

(10) Patent No.: US 11,812,203 B2
(45) Date of Patent: Nov. 7, 2023

(54) PROJECTION SYSTEM AND PROJECTION METHOD

(71) Applicant: Panasonic Intellectual Property Management Co., Ltd., Osaka (JP)

(72) Inventors: Keisuke Hara, Osaka (JP); Tetsuya Nishi, Osaka (JP); Yuki Hayashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/637,698

(22) PCT Filed: Aug. 13, 2020

(86) PCT No.: PCT/JP2020/030795
§ 371 (c)(1),
(2) Date: Feb. 23, 2022

(87) PCT Pub. No.: WO2021/039425
PCT Pub. Date: Mar. 4, 2021

(65) Prior Publication Data
US 2022/0295024 A1    Sep. 15, 2022

(30) Foreign Application Priority Data

Aug. 28, 2019  (JP) .................................. 2019-155598

(51) Int. Cl.
*H04N 9/31* (2006.01)
(52) U.S. Cl.
CPC ................................ *H04N 9/3179* (2013.01)

(58) Field of Classification Search
CPC .... G03B 21/008; G03B 21/28; G03B 21/208; G03B 21/2013; G03B 21/2033;
(Continued)

(56) References Cited

U.S. PATENT DOCUMENTS

2007/0195294 A1*  8/2007  Willey .................... G03B 21/26
                                                                353/34
2013/0286187 A1   10/2013  Slesinski
(Continued)

FOREIGN PATENT DOCUMENTS

EP         0979431 B1     9/2006
JP       H06-079663 A     3/1994
(Continued)

OTHER PUBLICATIONS

International Search Report dated Nov. 2, 2020 in International Application No. PCT/JP2020/030795, with English translation.

(Continued)

*Primary Examiner* — Sultan Chowdhury
(74) *Attorney, Agent, or Firm* — McDermott Will & Emery LLP

(57) ABSTRACT

A projection system includes: a projection device that includes a laser scanner and projects one or more drawings individually onto work spots in a work site; and an adjustment unit configured to adjust at least one of (i) a quantity of the one or more drawings to be simultaneously projected by the projection device or (ii) a setting parameter regarding a mode of projection performed by the projection device.

7 Claims, 11 Drawing Sheets

(58) Field of Classification Search
CPC .... H04N 9/315; H04N 9/3129; H04N 9/3155; H04N 9/3179; H04N 9/3182; H04N 9/3185; H04N 9/3194
See application file for complete search history.

(56) References Cited

U.S. PATENT DOCUMENTS

| | | | |
|---|---|---|---|
| 2016/0057400 A1 | 2/2016 | Winter et al. | |
| 2016/0343125 A1 | 11/2016 | Keitler et al. | |
| 2018/0217258 A1* | 8/2018 | Hirasawa | G01S 17/86 |
| 2019/0065003 A1* | 2/2019 | Lin | G03B 21/2033 |
| 2019/0149805 A1* | 5/2019 | Shpunt | H04N 13/363 348/46 |
| 2019/0163428 A1 | 5/2019 | Shibao et al. | |
| 2021/0286251 A1* | 9/2021 | Tscharntke | H04N 9/3185 |

FOREIGN PATENT DOCUMENTS

| | | |
|---|---|---|
| JP | 2001-259943 A | 9/2001 |
| JP | 2002-108435 A | 4/2002 |
| JP | 2010-122054 A | 6/2010 |
| JP | 2016-522905 A | 8/2016 |
| JP | 2017-075901 A | 4/2017 |
| JP | 2017-197369 A | 11/2017 |
| JP | 2018-077560 A | 5/2018 |
| JP | 2019-101603 A | 6/2019 |

OTHER PUBLICATIONS

Extended European Search Report dated Jun. 30, 2022 for the counterpart European Patent Application No. 20858396.3.

* cited by examiner

PROJECTION SYSTEM AND PROJECTION METHOD

CROSS-REFERENCE OF RELATED APPLICATIONS

This application is the U.S. National Phase under 35 U.S.C. § 371 of International Patent Application No. PCT/JP2020/030795, filed on Aug. 13, 2020, which in turn claims the benefit of Japanese Application No. 2019-155598, filed on Aug. 28, 2019, the entire disclosures of which Applications are incorporated by reference herein.

TECHNICAL FIELD

The present invention relates to a projection system and a projection method.

BACKGROUND ART

Conventional projection devices that can project images onto screens, for example, have been known. As a technique related to such projection devices, Patent Literature (PTL) 1 discloses a method for displaying objects of a design plan on a boundary surface of a room.

CITATION LIST

Patent Literature

[PTL 1] Japanese Unexamined Patent Application Publication (Translation of PCT Application) No. 2016-522905

SUMMARY OF INVENTION

Technical Problem

However, with the aforementioned conventional technique, a worker cannot perform work efficiently when there are many work spots.

In view of the above, the present invention aims to provide a projection system and a projection method that allow a worker to perform work efficiently, and makes it possible to shorten a construction period and reduce a burden on the worker.

Solution to Problem

In order to achieve the above, a projection system according to one aspect of the present invention includes: a projection device that projects one or more drawings individually onto work spots in a work site; and an adjustment unit configured to adjust at least one of (i) a quantity of the one or more drawings to be simultaneously projected by the projection device or (ii) a setting parameter regarding a mode of projection performed by the projection device.

Moreover, a projection method according to one aspect of the present invention includes: projecting, by a projection device, one or more drawings individually onto work spots in a work site; and adjusting at least one of (i) a quantity of the one or more drawings to be simultaneously projected by the projection device or (ii) a setting parameter regarding a mode of projection performed by the projection device.

Moreover, one aspect of the present invention can be achieved as a program that causes a computer to execute the above projection method. Alternatively, one aspect of the present invention can be achieved as a non-transitory computer-readable recording medium having the program recorded thereon.

Advantageous Effects of Invention

The present invention allows a worker to perform work efficiently, and makes it possible to shorten a construction period and reduce a burden on the worker.

DESCRIPTION OF EMBODIMENTS

Hereinafter, a projection system and a projection method according to embodiments of the present invention will be described in detail with reference to the drawings. Note that each of the embodiments described below shows a specific example of the present invention. Therefore, the numerical values, shapes, materials, structural components, the arrangement and connection of the structural components, steps and the order of the steps, or the like mentioned in the following embodiments are mere examples and not intended to limit the present invention. Therefore, among the structural components in the following embodiments, structural components not recited in any one of the independent claims representing broadest concepts of the present invention are described as optional structural components.

In addition, each diagram is a schematic diagram and is not necessarily a precise illustration. Therefore, for example, the scales etc. of the drawings are not necessarily precise. Moreover, throughout the figures, structural components that are essentially the same share like reference signs, and duplicate description is omitted or simplified.

Embodiment 1

[Overview]

Figure 1:
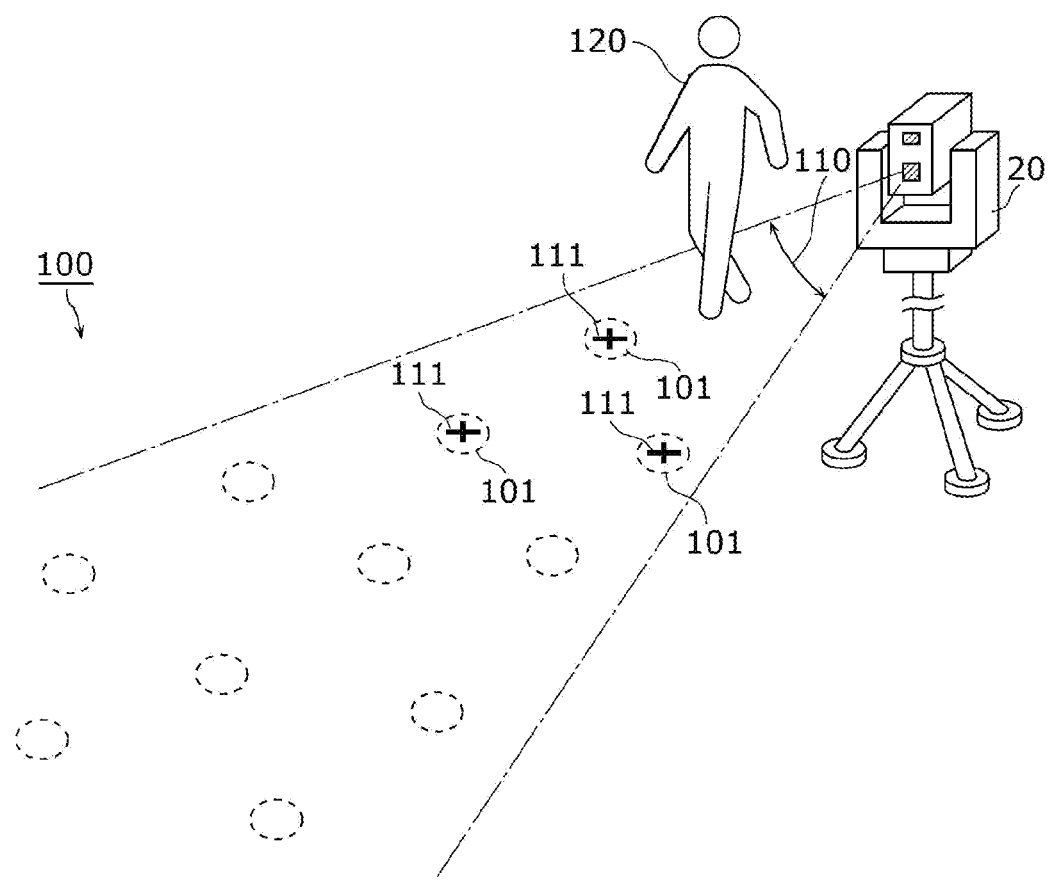
FIG. 1 is a perspective view of a work site where a projection system according to Embodiment 1 is to be used.
Figure 2:
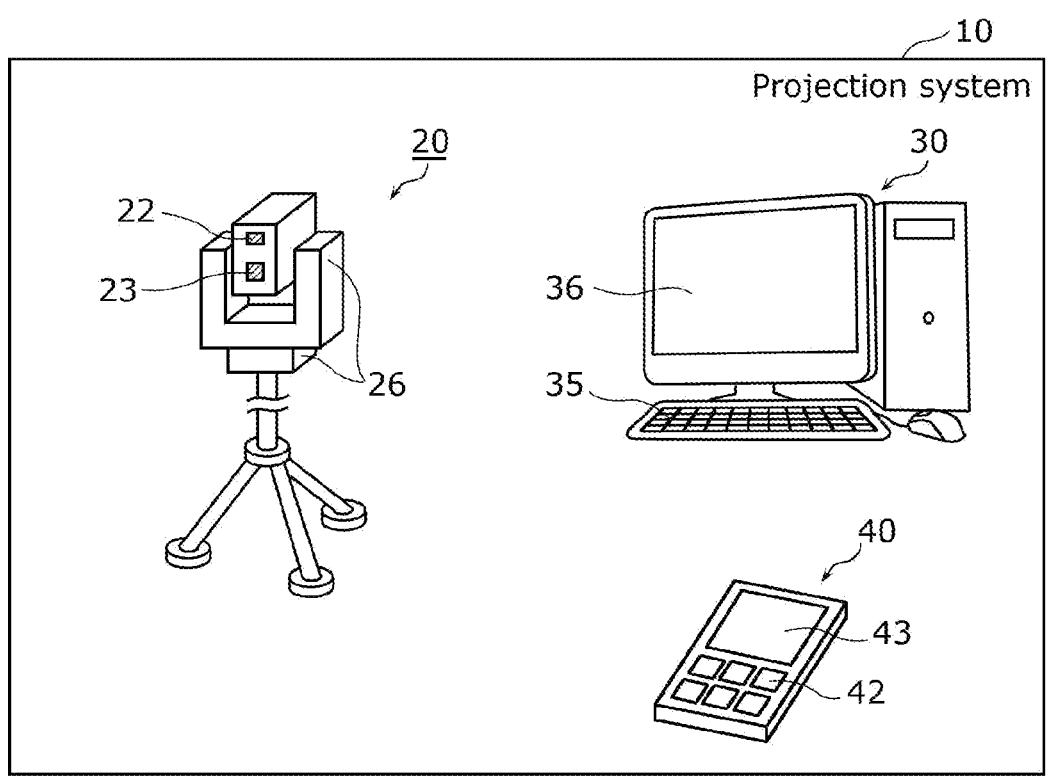
FIG. 2 is an external view of devices included in the projection system according to Embodiment 1.

First, an overview of a projection system according to an embodiment will be described with reference to FIG. 1 and FIG. 2. FIG. 1 is a perspective view of work site 100 where a projection system according to the present embodiment is to be used. FIG. 2 is an external view of devices included in projection system 10 according to the present embodiment.

As illustrated in FIG. 2, projection system 10 includes projection device 20. As illustrated in FIG. 1, projection device 20 is placed at a predetermined location in work site 100 in a building under construction. Projection device 20 projects drawing 111 onto a structure included in work site 100. Specifically, this structure may be a floor, a wall, a pillar, or a ceiling, for example.

Drawing 111 is, for example, a drawing to be projected onto work spot 101 in work site 100. Note that although work spots 101 are shown with broken lines in FIG. 1, work spots 101 are not shown in an actual work site 100. Therefore, when drawings 111 are not projected, worker 120 cannot recognize correct locations of work spots 101. Projecting drawings 111 enables worker 120 to recognize work spots 101. Worker 120 can perform work easily and accurately by performing the work in accordance with drawings 111.

Examples of the work include marking. For example, drawing 111 to be projected is a line or a shape of light having a length specified as designed and projected at a position where worker 120 should mark. Worker 120 can easily draw a marking line by simply tracing the line or shape of light shown in drawing 111. Note that, such a line or shape of light need not necessarily be used as a guide for drawing a marking line. A line or shape of light itself may be used as a marking line. Moreover, the work need not be marking. The work may be drilling, and may be any other work without limitation.

Work site 100 includes multiple work spots 101. At this time, projection range 110 projected by projection device 20 is limited, and thus it is difficult to project drawings 111 onto all work spots 101 simultaneously. Worker 120 performs work in accordance with the projected drawing 111. Therefore, the efficiency of the work deteriorates if the projection sequence of drawings 111 is not appropriate.

Furthermore, if projection device 20 could project drawings 111 onto all work spots 101, worker 120 may be confused about the sequence of work because many drawings 111 are projected at once. Moreover, worker 120 may not recognize the projected drawing 111 correctly depending on the environment of work site 100 (e.g., a bright environment) or a characteristic of worker 120 (e.g., having poor eyesight). This may deteriorate the efficiency of the work.

To address these issues, projection system 10 according to the present embodiment adjusts at least one of (i) the sequence and quantity of one or more drawings 111 to be projected by projection device 20 or (ii) a setting parameter regarding a mode of projection performed by projection device 20. This allows worker 120 to perform the work efficiently, and makes it possible to shorten a construction period and reduce burdens on the worker.

[Configuration]

Figure 3:
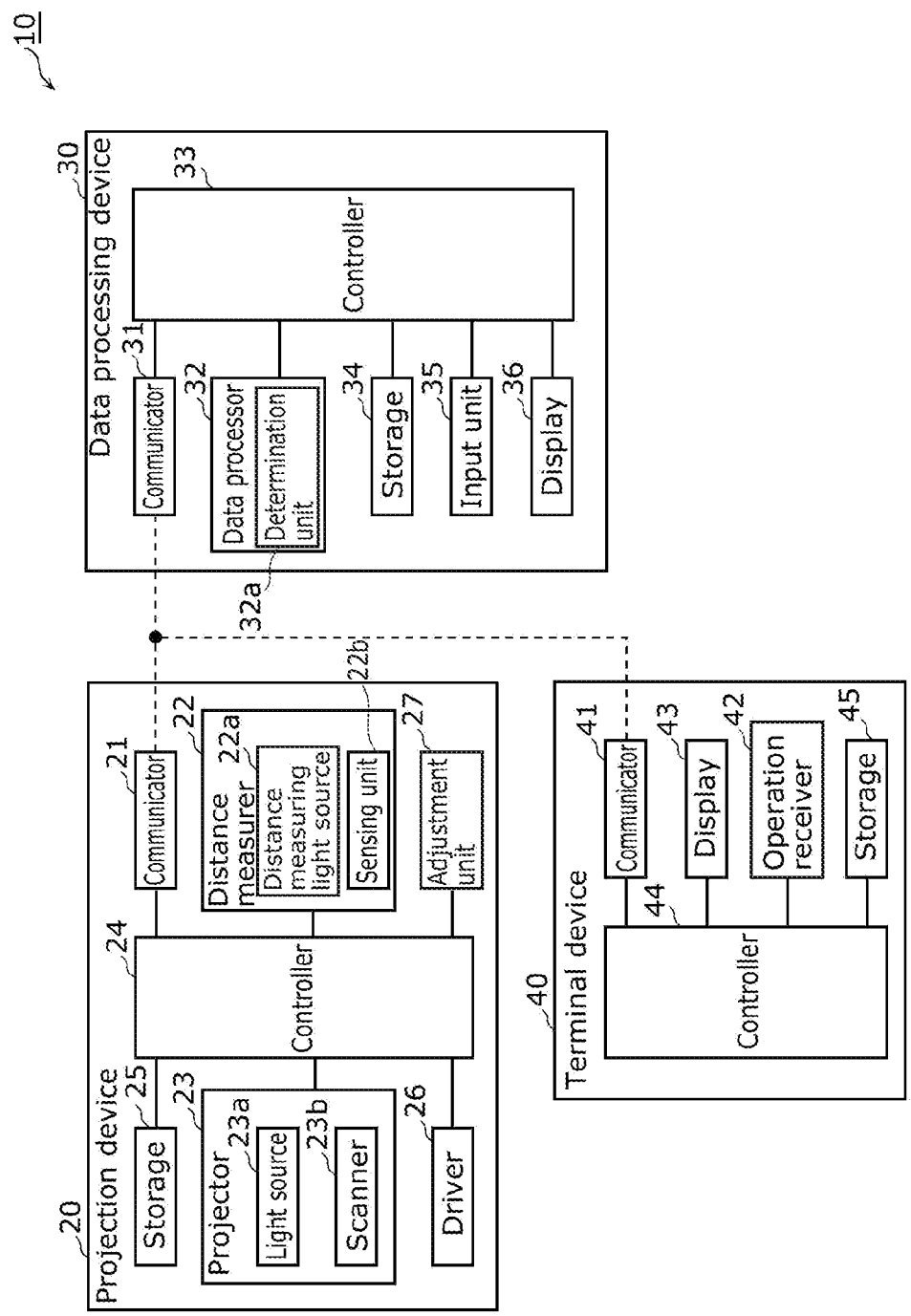
FIG. 3 is a block diagram of a functional configuration of the projection system according to Embodiment 1.

Next, a specific functional configuration of projection system 10 according to the present embodiment will be described with reference to FIG. 2 and FIG. 3. FIG. 3 is a block diagram of a functional configuration of projection system 10 according to the present embodiment.

As illustrated in FIG. 2 and FIG. 3, projection system 10 includes projection device 20, data processing device 30, and terminal device 40. The following describes a specific configuration of each of the devices included in projection system 10 one by one.

[Projection Device]

Projection device 20 is mounted on a tripod and placed at a predetermined location on the floor of work site 100, as illustrated in FIG. 1 and FIG. 2, for example. Alternatively, projection device 20 may be placed on a wall or ceiling of work site 100. As illustrated in FIG. 3, projection device 20 includes communicator 21, distance measurer 22, projector 23, controller 24, storage 25, driver 26, and adjustment unit 27.

Communicator 21 is a communication interface that allows projection device 20 to communicate with data processing device 30 and terminal device 40. Communicator 21 communicates wirelessly with each of data processing device 30 and terminal device 40, but may also communicate with those devices through wired communication. The standard of the communication to be performed by communicator 21 may be any standard without limitation.

Distance measurer 22 is an example of a detector and measures a distance from projection device 20 to a structure included in work site 100. Distance measurer 22 is a range image sensor, such as a time of flight (TOF) sensor, for example. The range image sensor produces a distance image as a result of distance measurement. Each of the pixel values of pixels that constitute the distance image indicates a distance from distance measurer 22. Note that distance measurer 22 may be any other distance measuring sensors. For example, distance measurer 22 may be a distance measuring sensor using a phase difference detection method, or a distance measuring sensor using a triangulation method. As illustrated in FIG. 3, distance measurer 22 includes distance measuring light source 22a and sensing unit 22b.

Distance measuring light source 22a is a light source that emits light to a structure. Distance measuring light source 22a is a light-emitting element that emits infrared light, for example. Alternatively, distance measuring light source 22a may be a light-emitting element that emits visible light. Note that distance measuring light source 22a need not be a different light source from light source 23a included in projector 23. Light source 23a included in projector 23 may be used as distance measuring light source 22a. In other words, distance measurer 22 need not include distance measuring light source 22a, and may be a sensor including only sensing unit 22b.

Sensing unit 22b is a light receiving element that detects reflected light, which is light emitted by distance measuring light source 22a and reflected off the structure. Sensing unit 22b is an image sensor including a photodiode array, for example.

Projector 23 is a projection module for projecting drawing 111 onto a projection plane. Projector 23 includes light source 23a and scanner 23b. Although not illustrated, projector 23 may include optical components, such as a lens and a mirror.

Light source 23a is a semiconductor laser element that emits visible light, for example. Alternatively, light source 23a may be a light emitting diode (LED). Light source 23a may have a configuration that makes it possible to change the emission color. For example, light source 23a may include multiple light-emitting elements that emit light in different colors. Examples of the light-emitting elements include blue light-emitting element, green light-emitting element, and red light-emitting element.

Scanner 23b scans a structure with the light emitted by light source 23a. Scanner 23b is a microelectromechanical systems (MEMS) mirror or a Galvano scanner, for example.

In the present embodiment, projector 23 projects a target drawing, which is a drawing to be projected onto a target spot. This target spot is a work spot determined by data processing device 30 among work spots 101. For example, in the example illustrated in FIG. 1, projector 23 individually projects three drawings 111 onto three work spots 101.

As described above, there is a limit to projection range 110 that can be projected by projector 23. For example, in projection range 110, when projection device 20 is placed on a horizontal plane, projection is possible in the range of approximately 40° in the horizontal direction and approximately 20° in the vertical direction. In order to project the drawing onto a work spot outside projection range 110, the orientation of projection device 20 needs to be changed. Alternatively, the location of projection device 20 needs to be changed. In the present embodiment, the direction and the range that can be projected by projector 23 are changed by changing the orientation of projection device 20 by driver 26.

Controller 24 is a control device that controls distance measurer 22, projector 23, and driver 26 to project drawing 111 onto a projection plane. For example, controller 24 is achieved by large scale integration (LSI), which is an integrated circuit (IC). Such an integrated circuit is not limited to LSI, and may be achieved by a dedicated circuit or a general-purpose processor. For example, controller 24 may be achieved by a microcomputer. Furthermore, controller 24 may be a field programmable gate array (FPGA) that can be programmed, or a reconfigurable processor capable of reconfiguring the connections and settings of circuit cells inside LSI.

Storage 25 is a recording device that stores a control program for projecting drawing 111. This control program is to be executed by controller 24. For example, storage 25 is non-volatile memory and is achieved by semiconductor memory.

Driver 26 is a drive mechanism for changing the orientation of projection device 20. Driver 26 changes the projectable direction by changing the orientation of projection device 20. For example, driver 26 can change the orientation of projection device 20 in directions of pan (horizontal direction), tilt (vertical direction) and roll (rotational direction). Driver 26 is achieved, for example, by a stepping motor. Note that projection device 20 need not include driver 26.

Adjustment unit 27 adjusts at least one of (i) a quantity of one or more drawings 111 to be simultaneously projected by projection device 20 or (ii) a setting parameter regarding a mode of projection performed by projection device 20. In the present embodiment, adjustment unit 27 adjusts a quantity of one or more drawings 111 to be simultaneously projected by projection device 20. Specifically, the quantity of one or more drawings 111 is the number of work spots 101 onto which drawings 111 are simultaneously projected. For example, in the example illustrated in FIG. 1, drawings 111 are individually projected onto three work spots 101. A specific example of adjustment performed by adjustment unit 27 will be described later with reference to FIG. 4.

In the present embodiment, projection device 20 individually projects one or more drawings 111 onto work spots 101 included in work site 100 in a predetermined sequence. The projection sequence of drawings 111 is determined by data processing device 30, for example. Projection device 20 projects one or more drawings 111 of the quantity adjusted by adjustment unit 27, in the sequence determined by data processing device 30. For example, projection device 20 projects three drawings 111 individually onto three work spots 101 as one set each time in accordance with the sequence. A specific example will be described later with reference to FIG. 7.

For example, when projection device 20 judges that all the work at the work spots onto which drawings 111 are being projected is finished, projection device 20 projects drawings 111 onto the next set of work spots 101 in accordance with the determined projection sequence. For example, the end of work is determined by controller 24, based on a signal transmitted by terminal device 40 operated by worker 120. Alternatively, controller 24 may determine the end of work, for example, based on an image captured by a camera, which is not illustrated. The camera captures images of how worker 120 performs work or a result of work at each work spot. Note that when sensing unit 22b generates a visible light image, controller 24 may use a detection result of sensing unit 22b, instead of an image captured by the camera.

[Data Processing Device]

Next, data processing device 30 will be described. Data processing device 30 is a device that performs processing regarding a drawing to be projected by projection device 20. Data processing device 30 is a computer device, for example. As illustrated in FIG. 3, data processing device 30 includes communicator 31, data processor 32, controller 33, storage 34, input unit 35, and display 36.

Communicator 31 is a communication interface that allows data processing device 30 to communicate with projection device 20 and terminal device 40. Communicator 31 communicates wirelessly with each of projection device 20 and terminal device 40, but may also communicate with those devices through wired communication. The standard of the communication to be performed by communicator 31 may be any standard without limitation.

Data processor 32 is a microcomputer or a processor, for example. Based on architectural design data, data processor 32 determines target spots that are work spots 101 at which worker 120 is to perform work, and target drawings to be projected onto the target spots. The target spots are, for example, work spots 101 included in projection range 110 of projection device 20 when projection device 20 is placed at a predetermined location. As illustrated in FIG. 3, data processor 32 includes determination unit 32a.

Determination unit 32a determines a projection sequence of drawings 111 to be individually projected onto work spots 101. The projection sequence corresponds to a work sequence that is a sequence of work to be performed by worker 120. Determination unit 32a determines the projection sequence based on the architectural design data. Determination unit 32a transmits, to controller 24 of projection device 20, via communicator 31 and communicator 21, sequence information indicating the determined projection sequence and the drawings to be individually projected onto the work spots.

The architectural design data is data that shows work spots 101. Specifically, the architectural design data is three-dimensional data showing the size and shape of work site 100. For example, the architectural design data is three-dimensional (3D) computer-aided design (CAD) data. The architectural design data also includes two-dimensional data showing a layout of work site 100 and two-dimensional data showing work spots 101. In the architectural design data, each of work spots 101 is associated with a corresponding drawing to be projected. When work spot 101 is determined as a target spot, a target drawing to be projected onto the target spot is determined by referring to the architectural design data.

For example, determination unit 32a associates the architectural design data with an actual work site 100. Such an actual work site 100 is shown, for example, by spatial data obtained by measuring distances to surrounding structures after projection device 20 is placed in work site 100. Such association specifies the location and orientation of projection device 20 in the architectural design data. Note that a user, such as worker 120 or a manager of the work, may input a position in the design data of the placed projection device 20. In other words, the distances of work site 100 need not be measured.

In the present embodiment, determination unit 32a determines, as the projection sequence, a sequence that produces the shortest route for one worker 120 passing through each of work spots 101 once. Here, determination unit 32a determines the projection sequence such that worker 120 does not pass through the same work spot 101 twice. Moreover, it is assumed that worker 120 can move the shortest distance between any two work spots 101, i.e., a straight-line distance. In other words, determination unit 32a determines the projection sequence based on what is called the traveling salesman problem.

Specifically, determination unit 32a assumes that work spots 101 are vertices and a cost of a side between the vertices is a straight-line distance between work spots 101, and determines the sequence that incurs the lowest cost. Note that the start point and the end point may be the location of projection device 20, for example. Alternatively, the start point and the end point may be one of work spots 101, or the start point and the end point may be different points.

Figure 4:
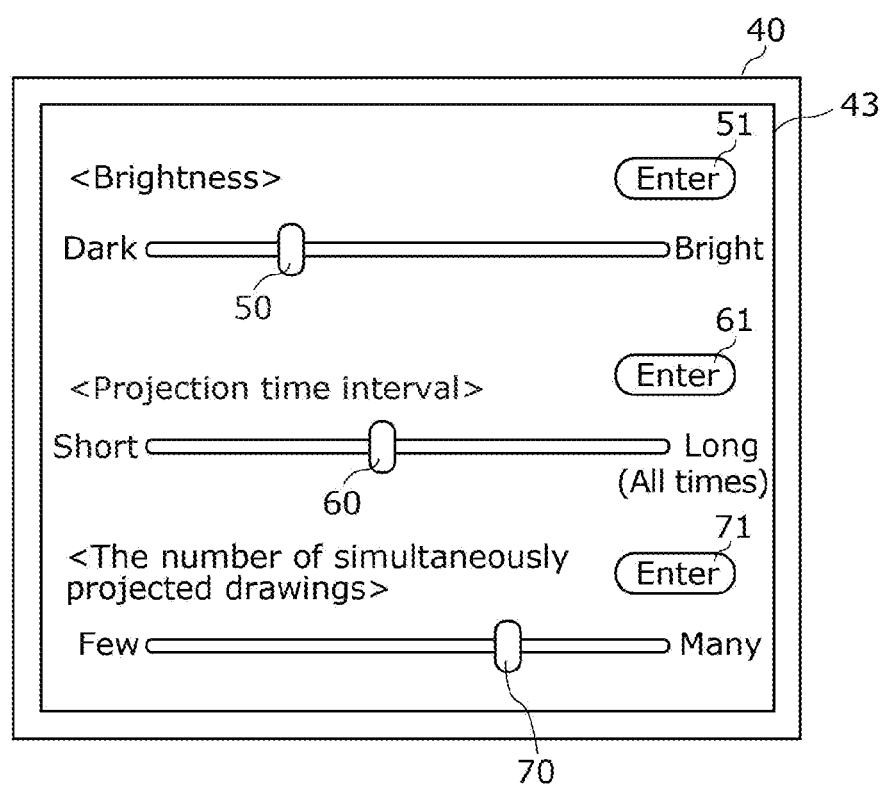
FIG. 4 is a diagram for illustrating an example of an adjustment screen for a setting parameter regarding a projection quantity of one or more drawings and a mode of projection in the projection system according to Embodiment 1.

Controller 33 is a control device that controls communicator 31, data processor 32, storage 34, input unit 35, and display 36 to determine the work sequence and a drawing, and generate an adjustment screen (see FIG. 4). Note that the adjustment screen is an operation screen for adjusting a projection quantity of one or more drawings and a setting parameter regarding a mode of projection to be performed by projection device 20. The adjustment screen will be described in detail later with reference to FIG. 4.

Controller 33 is achieved by, for example, LSI, which is an integrated circuit. Such an integrated circuit is not limited to LSI, and may be achieved by a dedicated circuit or a general-purpose processor. For example, controller 33 may be achieved by a microcomputer. Furthermore, controller 33 may be an FPGA that can be programmed, or a reconfigurable processor capable of reconfiguring the connections and settings of circuit cells inside LSI.

Storage 34 is a recording device that stores a control program for determining a work sequence and a drawing. This control program is to be executed by data processor 32 and controller 33. For example, storage 34 is non-volatile memory and is achieved by semiconductor memory. Storage 34 further stores the architectural design data and drawing data indicating a drawing to be projected.

Input unit 35 is an example of a receiver that receives an operation for data processing device 30. For example, input unit 35 is an input device, such as a keyboard or a mouse, or may be a touch sensor or a physical button.

Display 36 displays an adjustment screen for adjusting the projection quantity of one or more drawings and a setting parameter regarding a mode of projection to be performed by projection device 20. Display 36 is, for example, a liquid crystal display panel or an organic electroluminescence (EL) display panel.

[Terminal Device]

Next, terminal device 40 will be described. Terminal device 40 functions as a remote controller that allows worker 120 to remotely control projection device 20. For example, terminal device 40 is a dedicated remote controller for projection device 20. Alternatively, terminal device 40 may be a mobile terminal, such as a smartphone or a tablet device on which a dedicated application program is installed. As illustrated in FIG. 3, terminal device 40 includes communicator 41, operation receiver 42, display 43, controller 44, and storage 45.

Communicator 41 is a communication interface that allows terminal device 40 to communicate with projection device 20 and data processing device 30. Communicator 41 communicates wirelessly with each of projection device 20 and data processing device 30, but may also communicate with those devices through wired communication. The standard of the communication to be performed by communicator 41 may be any standard without limitation.

Operation receiver 42 is a user interface device that receives an operation of worker 120. For example, operation receiver 42 is achieved by one or more physical buttons, or may be a touch panel, or the like.

Display 43 displays an image showing an operating status of projection device 20, for example. Display 43 may display an adjustment screen for adjusting the projection quantity of one or more drawings and a setting parameter regarding a mode of projection to be performed by projection device 20. Display 43 is, for example, a liquid crystal display panel or an organic EL display panel.

Controller 44 is a control device that controls communicator 41, operation receiver 42, display 43, and storage 45. Controller 44 is achieved by LSI, which is an integrated circuit. Such an integrated circuit is not limited to LSI, and may be achieved by a dedicated circuit or a general-purpose processor. For example, controller 44 may be achieved by a microcomputer. Furthermore, controller 44 may be an FPGA that can be programmed, or a reconfigurable processor capable of reconfiguring the connections and settings of circuit cells inside LSI.

Specifically, controller 44 causes communicator 41 to transmit a signal to projection device 20 to operate projection device 20 in response to an operation received by operation receiver 42. For example, when operation receiver 42 receives an operation of an instruction indicating an end of work from worker 120, controller 44 causes communicator 41 to transmit an end signal indicating the end of work to projection device 20.

Storage 45 is a recording device that stores a control program that is to be executed by controller 44. For example, storage 45 is non-volatile memory and is achieved by semiconductor memory. Storage 45 may store unique identification information in terminal device 40.

[Adjusting Projection Quantity of One or More Drawings and Setting Parameter]

Next, a specific example of adjusting the projection quantity of one or more drawings 111 and a setting parameter of a mode of projection will be described with reference to FIG. 4.

FIG. 4 is a diagram for illustrating an example of an adjustment screen for the projection quantity of one or more drawings 111 and a setting parameter regarding a mode of projection in projection system 10 according to the present embodiment. The adjustment screen illustrated in FIG. 4 is displayed on display 43 of terminal device 40, for example. Alternatively, the adjustment screen may be displayed on display 36 of data processing device 30. When projection device 20 includes a display, the adjustment screen may be projected on such a display.

As illustrated in FIG. 4, the adjustment screen includes a graphical user interface (GUI) object for adjusting the following three items: brightness, a projection time interval, and the number of simultaneously projected drawings 111. The brightness and projection time interval are examples of the setting parameter regarding a mode of projection to be performed by projection device 20. The number of simultaneously projected drawings 111 is an example of the quantity of one or more drawings 111 to be simultaneously projected. Note that the adjustment screen may include only one of brightness, a projection time interval, and the number of simultaneously projected drawings.

[Adjusting Brightness]

The brightness corresponds to the light intensity to be emitted by projection device 20 when projection device 20 projects drawing 111. As illustrated in FIG. 4, the adjustment screen includes slider 50 for adjusting brightness and enter button 51.

Slider 50 is a GUI object for adjusting the brightness manually. The brightness is adjusted by moving slider 50 horizontally. Note that the adjustment screen may include a text box for inputting brightness or a radio button for selecting one of predetermined amounts of brightness, instead of slider 50 or in addition to slider 50.

Enter button 51 is a GUI object for setting the brightness of drawing 111 to the brightness indicated by slider 50. When worker 120 or the manager of the work selects enter button 51 after adjusting slider 50, adjustment unit 27 sets the brightness of drawing 111 to be the brightness indicated by slider 50.

Accordingly, when projection device 20 receives an input of operation regarding the brightness of drawing 111 to be projected from worker 120 or the manager of the work, projection device 20 can project drawing 111 with the received brightness. In other words, worker 120, etc. may adjust the brightness of drawing 111 to be projected to a desired brightness manually.

[Adjusting Projection Time Interval]

A projection time interval is a time interval for which projection device 20 projects drawing 111. In the present embodiment, projection device 20 can cause drawing 111 to blink. Specifically, projection device 20 can repeatedly switch between projecting drawing 111 and not projecting drawing 111. The projection time interval corresponds to a length of projection time for which drawing 111 is projected. The shorter the projection time interval is, the shorter drawing 111 blinks. The longer the projection time interval is, the longer drawing 111 is projected.

As illustrated in FIG. 4, the adjustment screen includes slider 60 for adjusting the projection time interval and enter button 61.

Slider 60 is a GUI object for adjusting the projection time interval manually. The projection time interval is adjusted by moving slider 60 horizontally. The position of slider 60 at which the projection time interval is the longest, specifically, the rightmost end of slider 60, means that drawing 111 is projected at all times.

Note that the adjustment screen may include a text box for inputting a projection time interval or a radio button for selecting one of predetermined projection time intervals, instead of slider 60 or in addition to slider 60.

Enter button 61 is a GUI object for setting the projection time interval of drawing 111 to the projection time interval indicated by slider 60. When worker 120 or the manager of the work selects enter button 61 after adjusting slider 60, adjustment unit 27 sets the projection time interval of drawing 111 to be the projection time interval indicated by slider 60.

Accordingly, when projection device 20 receives an input of operation regarding the projection time interval of drawing 111 to be projected from worker 120 or the manager of the work, projection device 20 can project drawing 111 for the received projection time interval. In other words, worker 120, etc. may manually adjust the projection time interval of drawing 111 to be projected for a desired projection time interval.

In the present embodiment, the projection time for which drawing 111 is projected and projection stopping time for which projection of drawing 111 is stopped are the same duration of time. Alternatively, the projection time and the projection stopping time may have mutually different duration of times. For example, the ratio between the projection time and the projection stopping time may be a fixed value. When the projection time interval is adjusted, the projection time and the projection stopping time are both adjusted.

Alternatively, the projection time and the projection stopping time may be adjusted independently of each other. This makes it possible to achieve a projection time and a projection stopping time desired by worker 120, etc.

Note that adjustment unit 27 may set a different mode for projecting at least one of the simultaneously projected drawings 111 from the mode for a remaining drawing 111. For example, adjustment unit 27 may project drawing 111 at all times onto work spot 101 at which work is currently being performed, and blink drawing 111 projected onto work spot 101 at which work is not currently being performed. Alternatively, adjustment unit 27 may project drawing 111 at all times onto work spot 101 at which work is currently being performed or not finished, and blink drawing 111 projected onto work spot 101 at which work is finished.

[Projection Quantity of One or More Drawings]

The projection quantity of one or more drawings 111 corresponds to the number of work spots 101 onto which projection device 20 simultaneously projects drawings 111 (i.e., the number of simultaneously projected drawings). As illustrated in FIG. 4, the adjustment screen includes slider 70 for adjusting the number of simultaneously projected drawings (projection quantity) and enter button 71.

Slider 70 is a GUI object for adjusting the projection quantity of one or more drawings 111 manually. The projection quantity of one or more drawings 111 is adjusted by moving slider 70 horizontally. Note that the adjustment screen may include a text box for inputting a projection quantity of one or more drawings 111 or a radio button for selecting one of predetermined projection quantities, instead of slider 70 or in addition to slider 70.

Enter button 71 is a GUI object for setting the projection quantity of one or more drawings 111 to the projection quantity indicated by slider 70. When worker 120 or the manager of the work selects enter button 71 after adjusting slider 70, adjustment unit 27 sets the projection quantity of one or more drawings 111 to be the projection quantity indicated by slider 70.

Accordingly, when projection device 20 receives an input of operation regarding the projection quantity of one or more drawings 111 (the number of simultaneously projected drawings) from worker 120 or the manager of the work, projection device 20 can project one or more drawings 111 of the received projection quantity. In other words, worker 120, etc. may manually adjust the projection quantity of one or more drawings 111 to project a desired quantity of drawings 111.

Note that the input by worker 120 is not limited to an operation input on the adjustment screen. For example, the input by worker 120 may be speech input. Specifically, input unit 35 of data processing device 30 or operation receiver 42 of terminal device 40 may be achieved by a microphone that receives speech.

[Operation]

Next, an operation of projection system 10 according to the present embodiment will be described with reference to FIG. 5.

Figure 5:
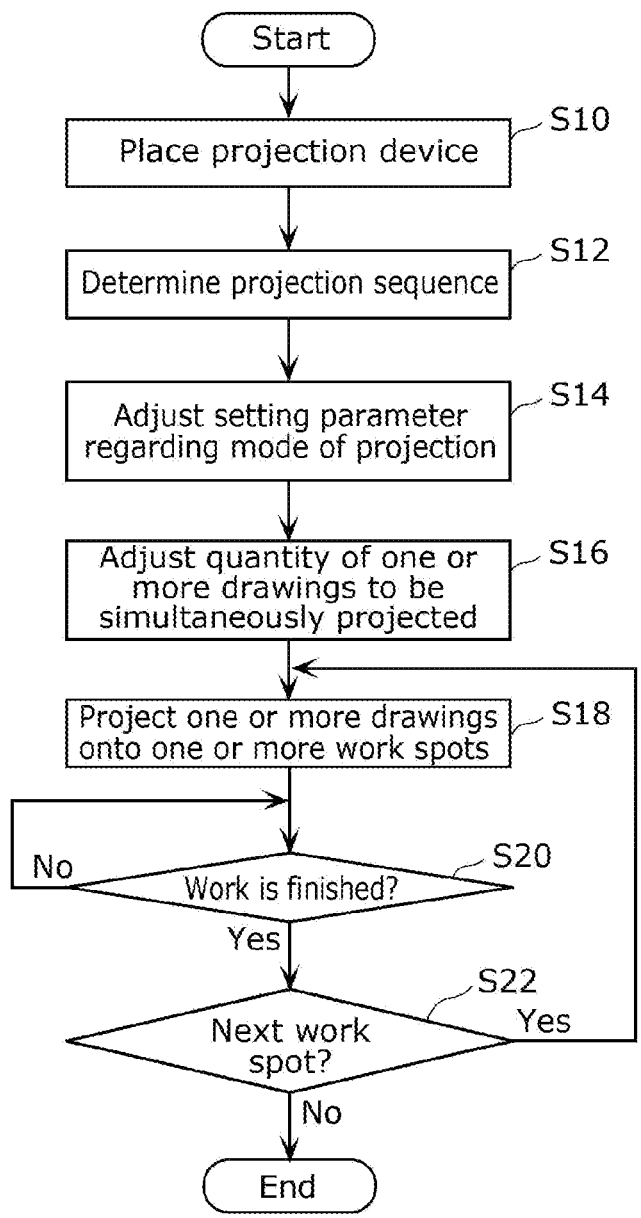
FIG. 5 is a flowchart of an operation of the projection system according to Embodiment 1.

FIG. 5 is a flowchart of an operation of projection system 10 according to the present embodiment. As illustrated in FIG. 5, first, worker 120 places projection device 20 at a predetermined location in work site 100 (S10). The location to be placed first may be any location determined by worker 120 or a location determined by data processing device 30. After projection device 20 is placed, data processing device 30 associates the actual work site 100 with the architectural design data.

Next, determination unit 32a of data processing device 30 determines the projection sequence (S12). Specifically, determination unit 32a determines the projection sequence for work spots 101 included in projection range 110 of projection device 20, in other words, a work sequence that is a sequence of work to be performed by worker 120.

Figure 6:
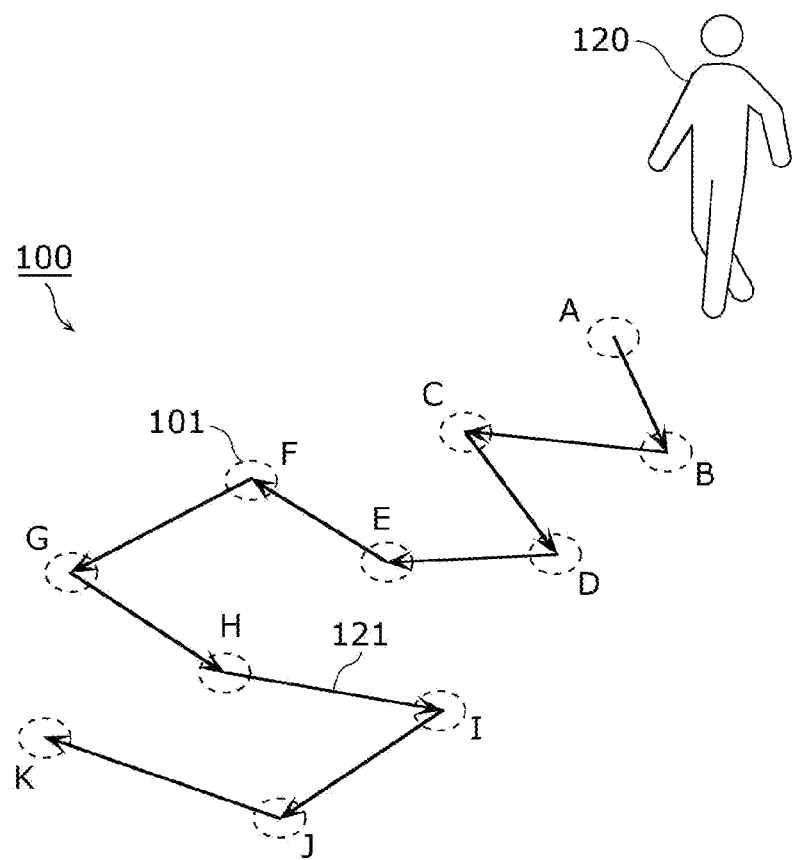
FIG. 6 is a perspective view illustrating an example of a work sequence (projection sequence of drawings) for work spots included in the work site.

FIG. 6 is a perspective view illustrating an example of a work sequence for work spots 101 included in work site 100. FIG. 6 illustrates 11 work spots 101. For example, determination unit 32a determines the projection sequence for 11 work spots 101. The determined sequence is sequence 121 indicated in the alphabetic order from "A" to "K" illustrated in FIG. 6. Sequence 121 is indicated by arrows connecting between work spots 101. The determined projection sequence (sequence 121) is the sequence in which the distance required for worker 120 to travel all work spots from the work spot "A" to the work spot "K" is the shortest.

Next, as illustrated in FIG. 5, adjustment unit 27 adjusts a setting parameter regarding a mode of projection (S14). For example, the adjustment screen illustrated in FIG. 4 is displayed on display 43 of terminal device 40. When operation receiver 42 receives an input from worker 120, operation receiver 42 receives setting information on the brightness and the projection time interval desired by worker 120. Adjustment unit 27 adjusts the brightness and the projection time interval based on the obtained setting information.

Adjustment unit 27 adjusts the quantity of one or more drawings 111 to be projected simultaneously (S16). Next, projection device 20 projects one or more drawings 111 of the adjusted quantity onto one or more work spots 101 (S18).

Figure 7:
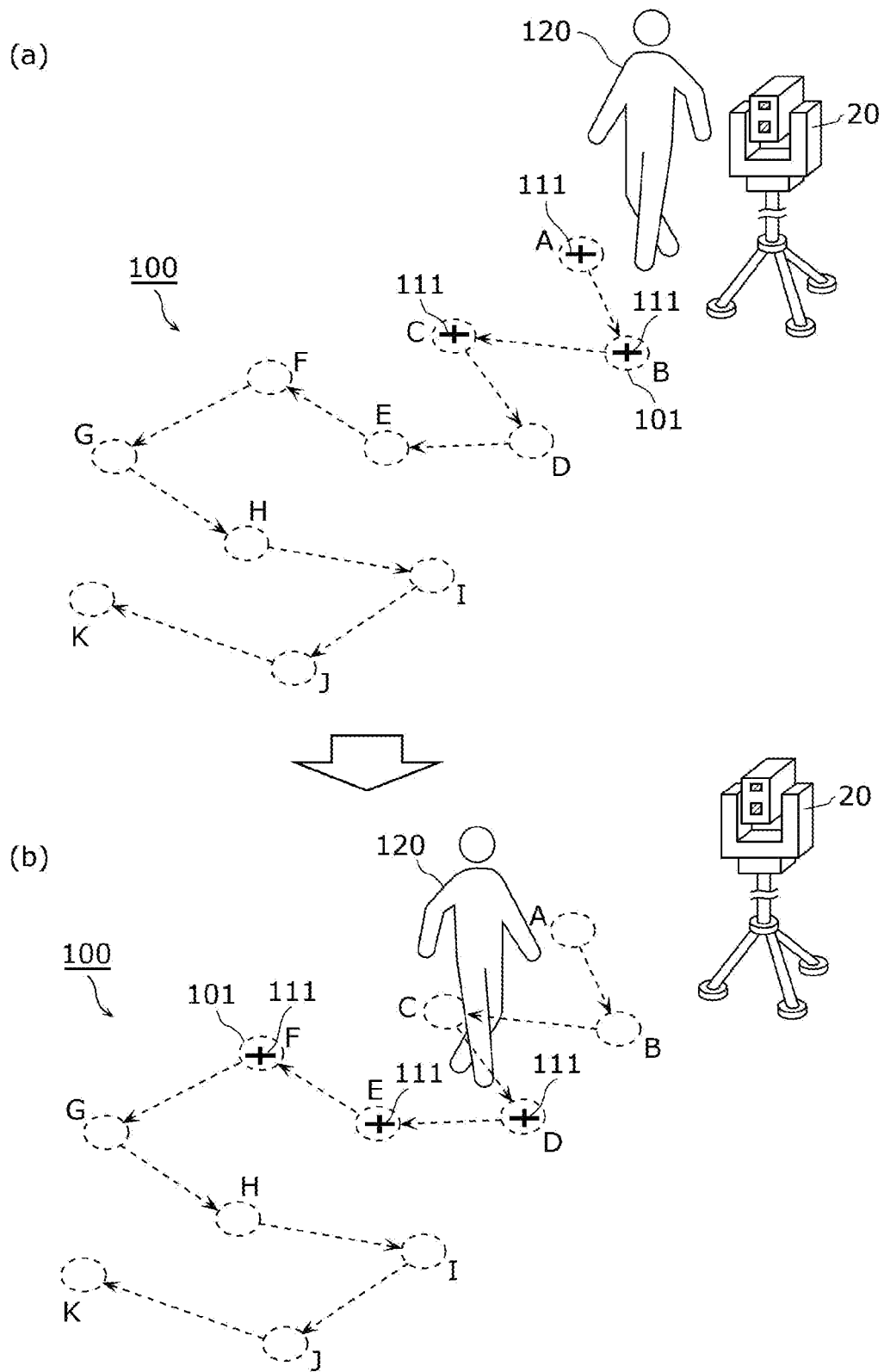
FIG. 7 is a perspective view illustrating a case where the drawings are individually projected onto three work spots each time by the projection system according to Embodiment 1, in accordance with the projection sequence.

Here, an example in which adjustment unit 27 determines, as the projection quantity of one or more drawings 111, the quantity of one or more drawings 111 corresponding to three work spots 101 will be described with reference to FIG. 7. FIG. 7 is a perspective view illustrating an example of the projection sequence of drawings 111 to be projected in a predetermined quantity by projection system 10 according to the present embodiment.

As illustrated in FIG. 7, projection device 20 projects drawing 111 onto each of three work spots 101 in accordance with the work sequence determined by determination unit 32a (specifically, in the sequence from "A" to "K"). For example, as in the example illustrated in (a) in FIG. 7, first, projection device 20 projects three drawings 111 individually onto work spots "A", "B" and "C" simultaneously.

Projecting drawings 111 onto multiple work spots 101 allows worker 120 to sequentially perform work, such as marking, based on drawing 111 projected onto each of work spots 101.

After the work at three work spots 101 is finished (Yes in S20), worker 120 provides an instruction indicating the end of work by operating terminal device 40. Drawings 111 are kept being projected onto the three work spots 101 until the end of work is instructed (No in S20).

After the end of work is instructed (Yes in S20), if there is a next work spot (Yes in S22), the process returns to step S18 and projection device 20 projects drawing 111 onto the next work spot 101. Specifically, as illustrated in (b) in FIG. 7, projection device 20 projects three drawings 111 individually onto the next work spots "D", "E", and "F" simultaneously.

Subsequently, until the work for all the work spots included in work site 100 is finished (No in S22), the processes of the above-described steps S18 to S22 are repeated.

Figure 8:
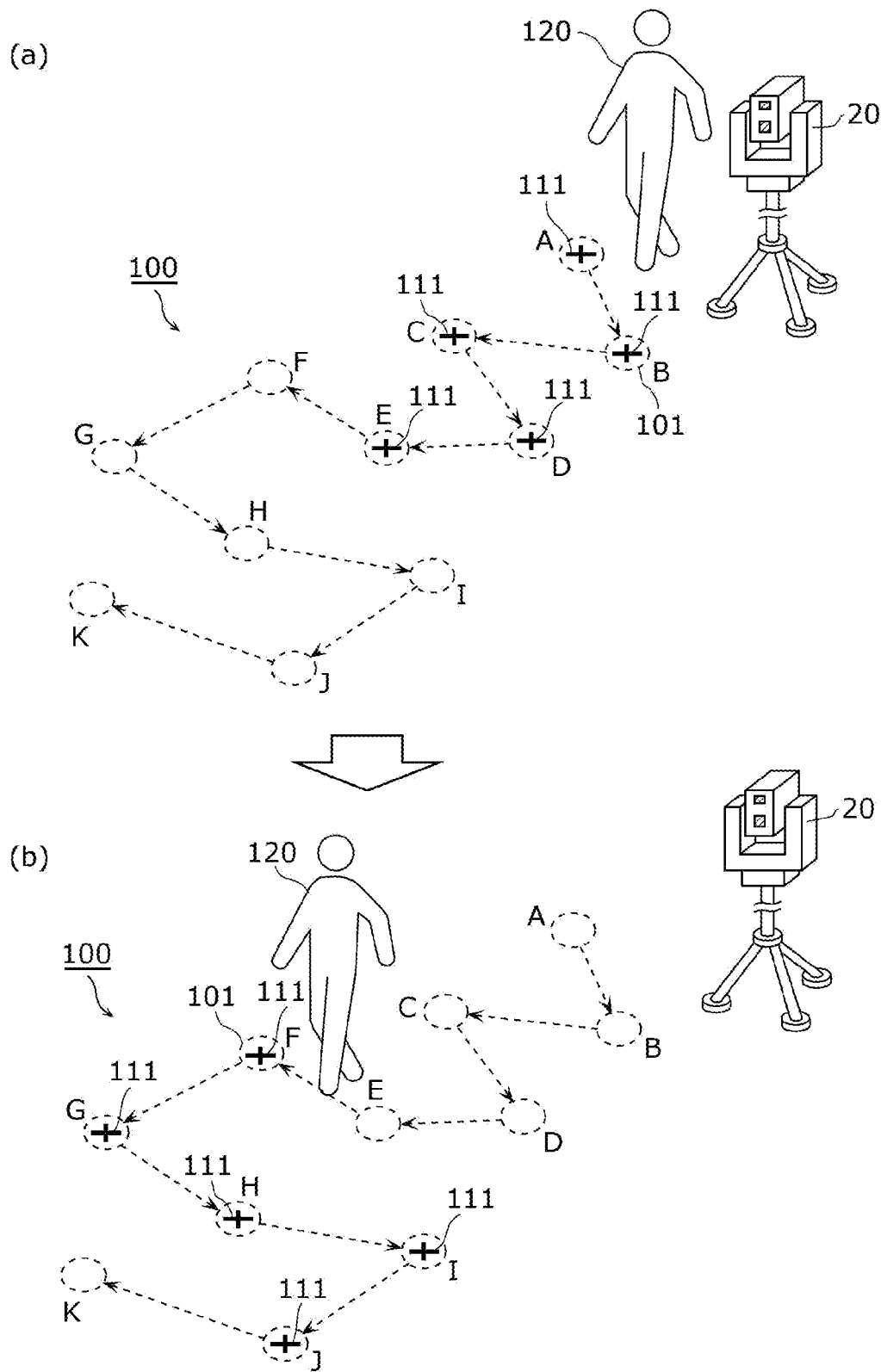
FIG. 8 is a perspective view illustrating a case where the drawings are projected onto five work spots each time by the projection system according to Embodiment 1, in accordance with the projection sequence.

FIG. 7 illustrates an example in which the projection quantity of one or more drawings 111 is for three work spots, but this should not be construed as limiting. FIG. 8 is a perspective view illustrating another example of a sequence of drawings 111 to be projected by projection system 10 according to the present embodiment. In FIG. 8, projection quantity of one or more drawings 111 is different from the projection quantity illustrated in FIG. 7. Specifically, FIG. 8 illustrates an example in which drawings 111 are individually projected onto five work spots 101 simultaneously.

As illustrated in (a) in FIG. 8, first, projection device 20 projects five drawings 111 individually onto five work spots 101, namely, "A", "B", "C", "D", and "E", simultaneously. After the work at the five work spots 101 is finished, as illustrated in (b) in FIG. 8, projection device 20 projects five drawings 111 individually onto the next five work spots "F", "G", "H", "I", and "J" simultaneously.

As described above, drawings 111 are projected in a quantity adjusted by adjustment unit 27 for each time, in accordance with the projection sequence (work sequence) determined by determination unit 32a. This makes it possible to project one or more drawings 111 in a quantity that is easier for worker 120 to perform work. Therefore, the efficiency of work can be improved.

Note that in the flowchart illustrated in FIG. 5, when the work at work spot 101 on which drawing 111 is projected is finished and there is a next work spot (Yes in S22), the process may return to step S16 and adjustment unit 27 may adjust the projection quantity again. Alternatively, when there is a next work spot (Yes in S22), the process may return to step S12 and the projection sequence may be determined again.

Moreover, one of adjustment of a setting parameter (S14) and adjustment of the projection quantity of one or more drawings 111 (S16) need not be performed. Moreover, in the adjustment of a setting parameter (S14), at least one of adjustment of brightness or adjustment of the projection time interval need not be performed.

[Effects, etc.]

As described above, projection system 10 according to the present embodiment includes: projection device 20 that projects one or more drawings 111 individually onto work spots 101 in work site 100; and adjustment unit 27 configured to adjust at least one of (i) a quantity of the one or more drawings to be simultaneously projected by projection device 20 or (ii) a setting parameter regarding a mode of projection performed by projection device 20.

This makes it possible to adjust the projection quantity of one or more drawings 111 or the setting parameter regarding a mode of projection such that worker 120 can perform the work easily. Therefore, this allows worker 120 to perform the work efficiently, and makes it possible to shorten a construction period and reduce burdens on worker 120.

Moreover, for example, projection system 10 further includes determination unit 32a configured to determine a projection sequence of the one or more drawings 111 to be individually projected onto work spots 101. Adjustment unit 27 adjusts the quantity of the one or more drawings 111 to be simultaneously projected by projection device 20. Projection device 20 projects the one or more drawings of the quantity adjusted by adjustment unit 27 in the projection sequence determined by determination unit 32a.

With this, one or more drawings 111 are projected in an appropriate sequence and an appropriate quantity. Therefore, worker 120 can perform work more easily and improve the efficiency of work.

Moreover, for example, determination unit 32a determines, as the projection sequence, a sequence that produces a shortest route for worker 120 passing through each of work spots 101 once.

With this, the time required for travel between work spots 101 can be reduced when worker 120 performs work at multiple work spots 101. Therefore, the efficiency of work can be improved.

Moreover, for example, adjustment unit 27 adjusts the setting parameter. The setting parameter is at least one of (i) light intensity to be used for projection of the one or more drawings 111 or (ii) a projection time interval for the one or more drawings 111.

With this, when the light intensity to be used for projection of one or more drawings 111 is adjusted, the one or more drawings 111 can be projected with a brightness that is easier for worker 120 to see. Therefore, the efficiency of work can be improved. Moreover, when the projection time interval for one or more drawings 111 is adjusted, the one or more drawings 111 can be projected in accordance with the speed of work by worker 120. Therefore, the efficiency of work can be improved.

Moreover, for example, a projection method includes: projecting, by projection device 20, one or more drawings 111 individually onto work spots 101 in work site 100; and adjusting at least one of (i) a quantity of the one or more drawings 111 to be simultaneously projected by projection device 20 or (ii) a setting parameter regarding a mode of projection performed by projection device 20.

This makes it possible to adjust the projection quantity of one or more drawings 111 or the setting parameter regarding a mode of projection such that worker 120 can perform the work easily. Therefore, this allows worker 120 to perform the work efficiently, and makes it possible to shorten a construction period and reduce a burden on worker 120.

Embodiment 2

Next, Embodiment 2 will be described.

In the projection system according to Embodiment 2, projection of drawing 111 is stopped when there is an obstacle disturbing projection of drawing 111 in work site 100, and drawing 111 is projected again after drawing 111 is projectable again. The following mainly describes differences from Embodiment 1, and overlapping description is omitted or simplified.

[Configuration]

Figure 9:
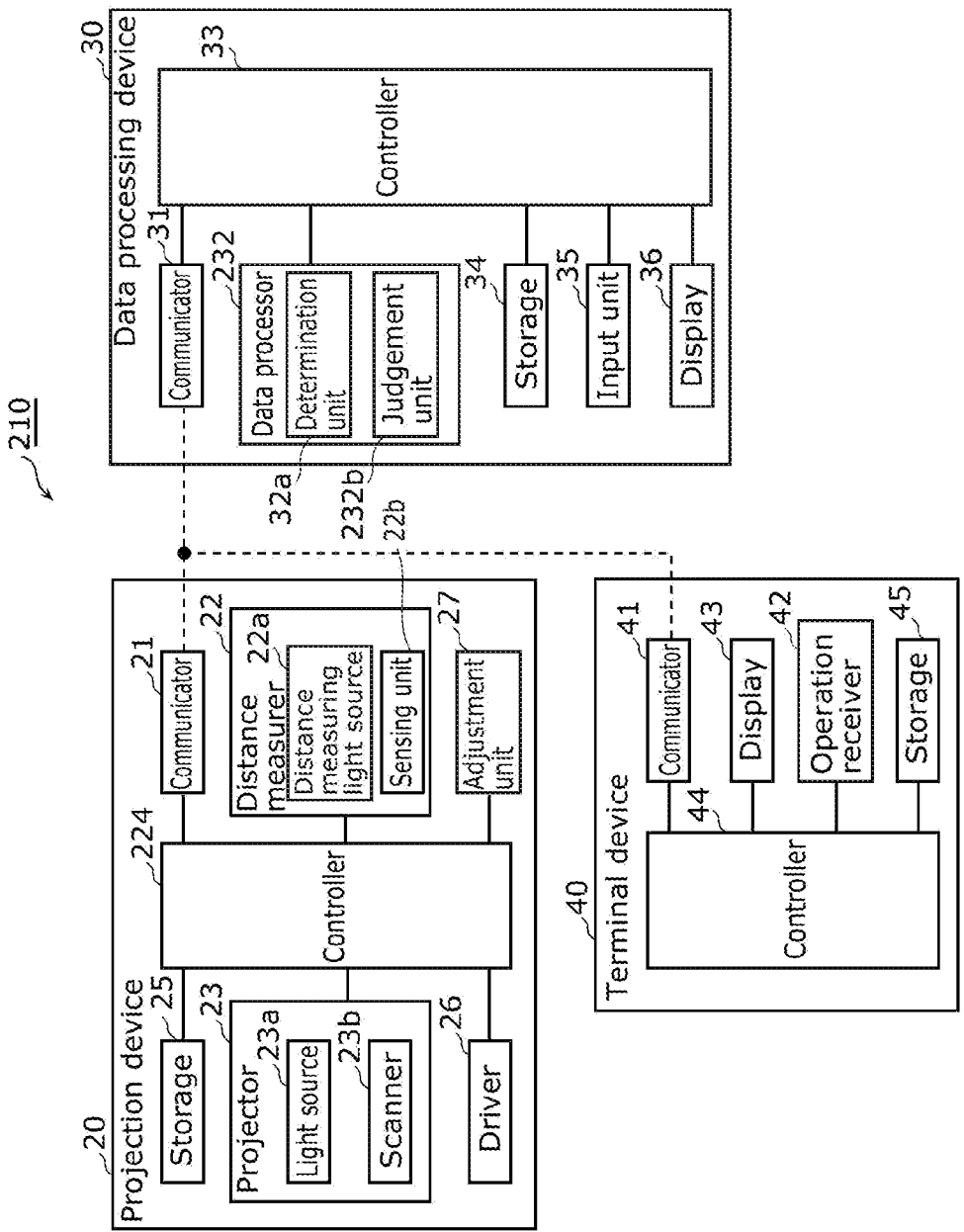
FIG. 9 is a block diagram of a functional configuration of a projection system according to Embodiment 2.

First, a configuration of a projection system according to the present embodiment will be described with reference to FIG. 9. FIG. 9 is a block diagram of a functional configuration of projection system 210 according to the present embodiment.

In projection system 210 illustrated in FIG. 9, the following points are different from projection system 10 according to Embodiment 1: Data processing device 30 includes data processor 232 instead of data processor 32, and projection device 20 includes controller 224 instead of controller 24. Data processor 232 additionally includes judgment unit 232b.

Judgment unit 232b judges whether drawing 111 is projectable onto work spot 101. Specifically, judgment unit 232b judges whether drawing 111 that should be originally projectable can be projected when an obstacle is present in work site 100. For example, there may be cases where a work tool used by worker 120 or a building material may be placed in work site 100. A work tool, a building material, or the like is obstacle 130 (see FIG. 10) that is not included in the architectural design data. When obstacle 130 is present between projection device 20 and work spot 101, drawing 111 projected by projection device 20 is disturbed by obstacle 130, and drawing 111 cannot be projected onto work spot 101.

Figure 10:
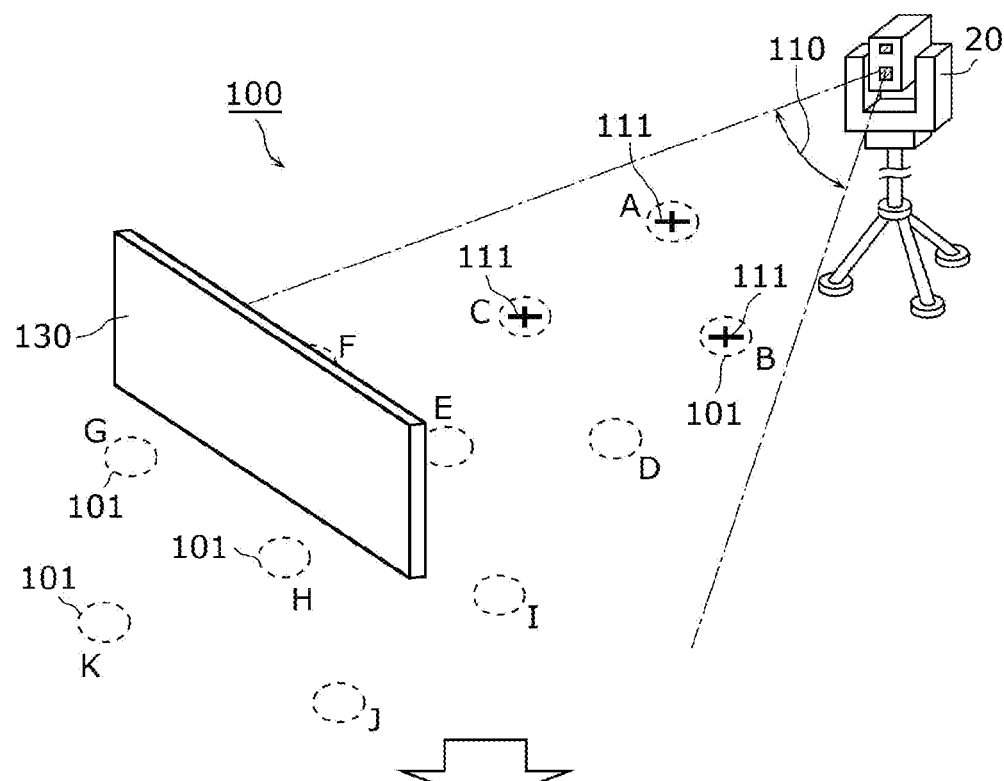
FIG. 10 is an external view for illustrating a case where the projection system according to Embodiment 2 projects drawings when an obstacle is present.
Figure 10:
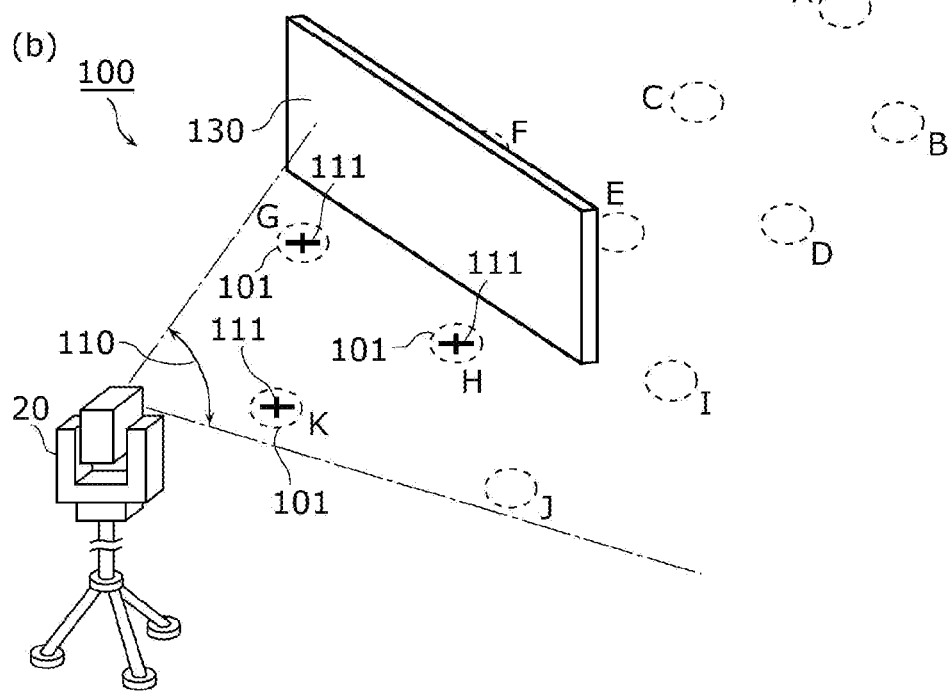

FIG. 10 is a perspective view for illustrating a case where projection system 210 according to the present embodiment projects drawing 111 when obstacle 130 is present. As illustrated in (a) in FIG. 10, projection device 20 can project drawings 111 onto work spots "A", "B", and "C". However, projection device 20 cannot project drawings 111 onto work spots "G", "H", and "K".

In the present embodiment, judgment unit 232b judges whether drawing 111 is projectable, based on information input by operation receiver 42 of terminal device 40 or input unit 35 of data processing device 30. For example, when projection device 20 projects drawing 111, worker 120 visually checks whether drawing 111 can be projected onto work spots 101. When drawing 111 could not be projected onto work spot 101, worker 120 inputs, via terminal device 40 or data processing device 30, information indicating work spot 101 onto which drawing 111 could not be projected. Judgment unit 232b judges whether drawing 111 is projectable based on the input information, and stores, in storage 34, unprojectable information indicating work spot 101 that is judged to be a work spot on which drawing 111 is unprojectable.

Note that judgment unit 232b may judge whether drawing 111 is projectable onto work spot 101 in a way other than using input from worker 120. For example, judgment unit 232b may judge whether drawing 111 is projectable onto work spot 101, based on an image obtained by a camera placed in work site 100 and capturing work site 100. Note that the camera capturing work site 100 may be included in projection device 20. The camera captures drawing 111 projected by projection device 20 and work spot 101. With this, judgment unit 232b can judge whether drawing 111 is appropriately projected onto work spot 101.

Judgment unit 232b may judge whether drawing 111 is projectable before drawing 111 is projected. For example, judgment unit 232b detects, as obstacle 130, an object not included in the architectural design data based on the image captured by the camera. Judgment unit 232b judges whether drawing 111 is projectable, based on the detected location of obstacle 130, the location of projection device 20, and the location of work spot 101.

Moreover, in the present embodiment, an example of a configuration that data processor 232 of data processing device 30 includes judgment unit 232b, but this should not be construed as limiting. Projection device 20 or terminal device 40 may include judgment unit 232b.

In the present embodiment, projection device 20 stops projection of drawing 111 onto work spot 101 judged by judgment unit 232b to be work spot 101 onto which drawing 111 is unprojectable. Specifically, controller 224 obtains a judgment result of judgment unit 232b and stops projection of drawing 111 based on the obtained judgment result.

When the location of projection device 20 is changed, controller 224 resumes projection of drawing 111 onto the work spot for which projection drawing 111 is stopped, based on the unprojectable information stored in storage 34. Note that when the location of projection device 20 is changed at the time of resuming projection, determination unit 32a may determine a new work sequence.

Moreover, when obstacle 130 is moved and the projection of drawing 111 becomes possible, controller 224 may resume projection of drawing 111 onto the work spot for which projection of the drawing is stopped, based on the information stored in storage 34. For example, judgment unit 232b judges whether obstacle 130 is moved.

[Operation]

Figure 11:
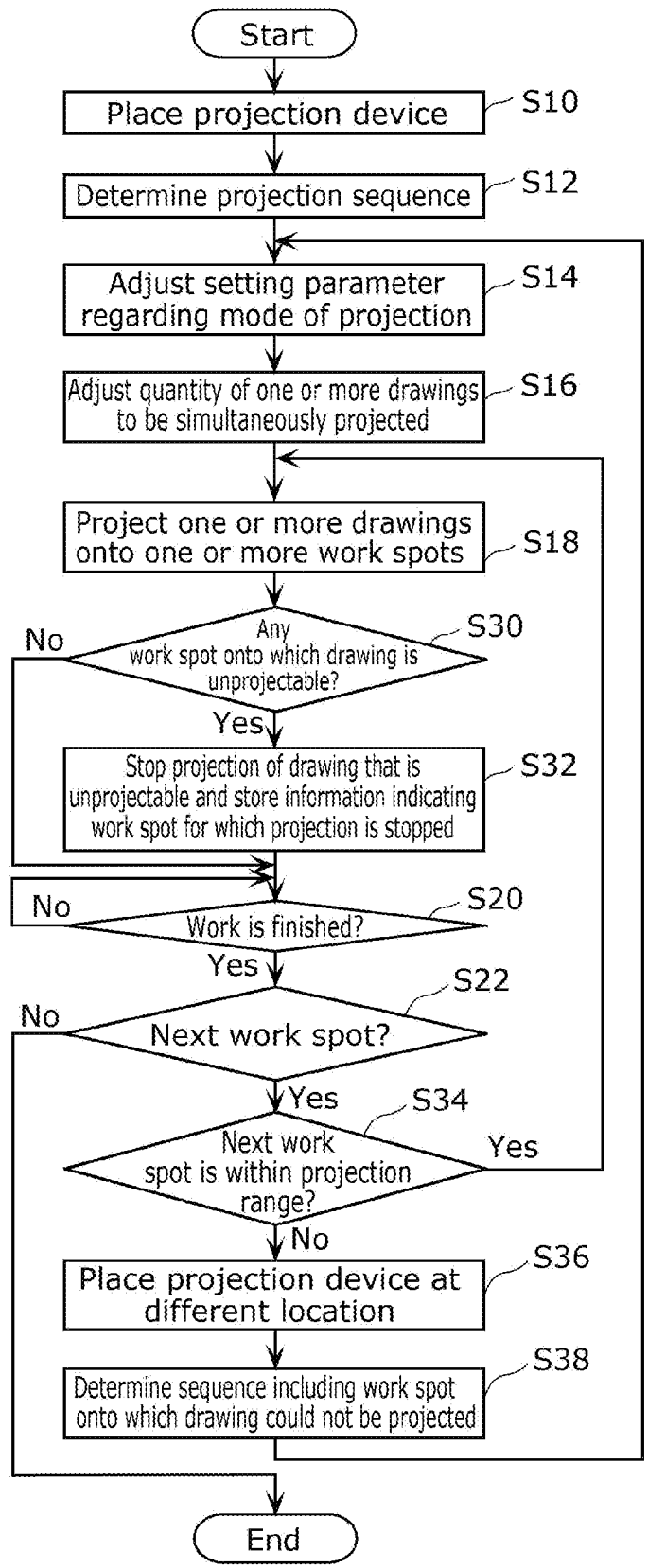
FIG. 11 is a flowchart of an operation of the projection system according to Embodiment 2.

Next, an operation of projection system 210 according to the present embodiment will be described with reference to FIG. 11. FIG. 11 is a flowchart of an operation of projection system 210 according to the present embodiment.

As illustrated in FIG. 11, the processes (S10 to S18) starting from placing projection device 20 to projecting one or more drawings 111 onto one or more work spots 101 are the same as in Embodiment 1.

Next, judgment unit 232b judges whether any work spot 101 onto which drawing 111 is unprojectable is present (S30). For example, as in the example illustrated in (a) in FIG. 10, when drawings 111 are to be individually projected onto the work spots "G", "H", and "K" from projection device 20, drawings 111 that should be projected onto work spots "G", "H", and "K" are disturbed by obstacle 130. Therefore, worker 120 can recognize that drawings 111 are not projected onto work spots "G", "H", and "K", by seeing the situation that drawings 111 are projected onto obstacle 130.

Here, display 43 of terminal device 40 may display an image showing one or more work spots 101 (specifically, work spots "G", "H", and "K") onto which projection device 20 attempts to display one or more drawings 111. Worker 120 can easily specify work spot 101 onto which drawing 111 could not be projected, by comparing the image displayed on display 43 and the projection state of drawing 111 in the actual work site 100. Worker 120 operates terminal device 40 to input the work spot onto which drawing 111 could not be projected. Judgment unit 232b judges presence or absence of any work spot onto which drawing 111 could not be projected, based on the input information.

When it is determined that there is work spot 101 onto which drawing 111 is unprojectable (Yes in S30), projection device 20 stops projection of drawing 111 onto work spot 101 onto which drawing 111 is unprojectable (S32). Furthermore, judgment unit 232b stores unprojectable information indicating work spot 101 onto which drawing 111 is unprojectable in storage 34. Worker 120 performs work at work spots 101 onto which drawing 111 is projectable. When there is no work spot 101 onto which drawing 111 is unprojectable (No in S30), worker 120 can perform work in accordance with the projected drawing 111, and thus projection system 210 does not perform the process in step S32 and waits for the work to be finished.

After the work at work spot 101 is finished (Yes in S20), worker 120 provides an instruction indicating the end of work by operating terminal device 40. Drawing 111 is kept being projected onto work spot 101 until the end of work is instructed (No in S20).

When the end of work is instructed (Yes in S20) and the next work spot is present (Yes in S22), whether the next work spot is within the projection range of projection device 20 is judged in projection system 210 (S34). Such judgment is performed by data processing device 30, for example. Specifically, data processor 32 judges whether the next work spot is within projection range 110, based on the location of projection device 20.

When the next work spot is within projection range 110 (Yes in S34), the process returns to step S18 and projection device 20 projects drawing 111 onto the next work spot 101.

When the next work spot is not within projection range 110 (No in S34), projection device 20 is placed at a different location by worker 120 (S36). Next, determination unit 32a of data processing device 30 determines the projection sequence including the work spot onto which drawing 111 could not be projected (S38). Specifically, determination unit 32a reads out the unprojectable information stored in storage 34 and determines the projection sequence of work spots 101 including the work spot indicated in the unprojectable information in projection range 110 of projection device 20 at a new location. The projection sequence is, in other words, the work sequence to be performed by worker 120. After the work sequence is determined, the process returns to step S14, and the process of adjusting the setting parameter and the subsequent processes are repeated.

Note that, after the work sequence is determined, the process may return to step S16 and the process of adjusting the projection quantity and the subsequent processes may be repeated. In other words, the process of adjusting the setting parameter (S14) need not be repeated. Alternatively, after the work sequence is determined, the process may return to step S18 and the projecting of one or more drawings 111 and the subsequent processes may be repeated. In other words, the adjusting of the projection quantity of one or more drawings 111 (S16) need not be repeated.

When the work is finished (Yes in S20) and there is no next work spot (No in S22), the operation of projection system 210 is ended.

Note that the redetermining of the projection sequence (S38) after the location of projection device 20 is changed need not be performed. For example, after the location of projection device 20 is changed, projection of drawing 111 onto work spot 101 on which drawing 111 could not be projected may be projected in preference to another work spot 101.

[Effects, Etc.]

As described above, projection system 210 according to the present embodiment further includes, for example, judgment unit 232b configured to judge whether drawing 111 is projectable onto work spot 101, and storage 34 configured to store information indicating work spot 101 judged by judgment unit 232b to be a work spot onto which drawing 111 is unprojectable. Projection device 20 stops projection of drawing 111 onto work spot 101 judged by judgment unit 232b to be work spot 101 onto which drawing 111 is unprojectable. When a location of projection device 20 is changed, projection device 20 resumes projection of drawing 111 onto work spot 101 for which projection of drawing 111 is stopped, based on the information stored in storage 34.

With this, even when drawing 111 cannot be projected properly, drawing 111 is projected after the location of projection device 20 is changed. Therefore, this reduces omission of projection of drawing 111, and reduces unfinished work being left as it is. Moreover, stopping projection of drawing 111 for work spot 101 onto which drawing 111 is unprojectable makes it possible to reduce power consumption required for the projection.

[Others]

The projection system and the projection method according to the present invention have been described based on the embodiment above. However, the present invention should not be limited to the embodiment.

For example, in the embodiment, an example in which the number of work spots 101 onto which one or more drawings 111 are projected is a projection quantity of one or more drawings 111, but this should not be construed as limiting. For example, the projection quantity of one or more drawings 111 may be a total size of one or more drawings 111 to be projected onto one or more work spots 101. A size of a drawing is, for example, an area of drawing 111 or a total length of lines that form drawing 111. With this, even when the sizes of drawings 111 to be projected onto the respective work spots 101 are different, the projection quantity of one or more drawings 111 can be adjusted appropriately.

Moreover, for example, the work sequence may be determined by worker 120 or a manager of the work. For example, determination unit 32a may generate an input screen that allows worker 120 or the manager of the work to input the work sequence (i.e., projection sequence of the drawings), and may cause display 36 to display the input screen. The input screen is, for example, a selection screen including an image showing work site 100 and all work spots 101 included in work site 100 in two dimensions or three dimensions. On the input screen, all work spot 101 can be selected sequentially, for example. Determination unit 32a determines the selected sequence as the work sequence (i.e., the projection sequence of the drawings). Projection device 20 projects the drawings in the determined sequence. This makes it possible for worker 120 to perform work in the determined sequence.

Note that the input of the work sequence and the displaying of the input screen may be performed on terminal device 40. In other words, data processing device 30 need not include input unit 35 and display 36.

Moreover, for example, in each of the embodiments and the variations, an example in which projection device 20, data processing device 30, and terminal device 40 are separate devices has been described. However, these may be integrated together as a single device. In other words, projection system 10 may be an integrated device that collectively includes the structural components inside or outside of one physical casing.

Note that not all the structural components included in projection system 10 need be integrated together. For example, only projection device 20 and terminal device 40 may be integrated together as a single device. Alternatively, only projection device 20 and data processing device 30 may be integrated together as a single device.

In addition, the communication method between the devices described in the above embodiment may be any communication method without limitation. When wireless communication is performed between the devices, the wireless communication method (communication standard) is, for example, near-field communication, such as ZigBee (registered trademark), Bluetooth (registered trademark), or a wireless local area network (LAN). Alternatively, the wireless communication method (communication standard) may be communication over a wide area network, such as the Internet.

In addition, wired communication may be performed between the devices instead of wireless communication. Specifically, wired communication is communication using power line communication (PLC) or wired LAN.

Moreover, in the above embodiments, a process performed by a particular processor may be performed by another processor. For example, projection device 20 may include processors included in data processing device 30 (for example, determination unit 32a, judgment unit 232b, input unit 35, display 36, etc.), and may perform a process to be performed by each of the processors. Moreover, for example, projection device 20 may include processors included in terminal device 40 (for example, operation receiver 42, display 43, etc.), and may perform a process to be performed by each of the processors. Moreover, for example, data processing device 30 or terminal device 40 may include adjustment unit 27.

Moreover, the sequence of processes may be changed, or processes may be performed in parallel. Moreover, allocation of the structural components included in the projection system to multiple devices is an example. For example, structural components included one device may be included in another device. Moreover, the projection system may also be achieved as a single device.

For example, the processes described in the embodiments may be achieved by centralized processing by a single device (system), or by distributed processing by multiple devices. Moreover, the processor that executes the above program may be one processor or multiple processors. In other words, centralized processing may be performed, or distributed processing may be performed.

In addition, in each of the above embodiments, all or part of the structural components, such as the controllers, may include dedicated hardware, or may be achieved by executing an appropriate software program for each structural component. Each structural component may be achieved by a program executor, such as a central processing unit (CPU) or a processor, reading and executing a software program recorded on a recording medium, such as a hard disk drive (HDD) or semiconductor memory.

In addition, the structural components, such as the controllers, may include one or more electronic circuits. One or more electronic circuits may each be either a general-purpose circuit or a dedicated circuit.

One or more electronic circuits may include, for example, a semiconductor device, an integrated circuit (IC) or large scale integration (LSI). An IC or LSI may be integrated into a single chip or multiple chips. Due to a difference in the degree of integration, the electronic circuit referred here to as an IC or LSI may be referred to as a system LSI, very large scale integration (VLSI), or ultra large scale integration (ULSI). Furthermore, a field programmable gate array (FPGA) which is programmable after manufacturing of the LSI can be used for the same purposes.

In addition, the general or specific aspects of the present invention may be achieved by a system, a device, a method, an integrated circuit, or a computer program. Alternatively, these may be achieved using a non-transitory computer-readable recording medium, such as an optical disk, HDD, or semiconductor memory storing the computer program. Furthermore, these may be achieved using any combination of systems, devices, methods, integrated circuits, computer programs, and recording media.

Other than the above, the present invention also includes embodiments as a result of adding various modifications that may be conceived by those skilled in the art to each of the embodiments, and embodiments obtained by combining structural components and functions in each of the embodiments in any manner as long as the combination does not depart from the scope of the present invention.

The invention claimed is:

1. A projection system comprising:
a projection device that includes a laser scanner and projects one or more drawings individually onto work spots in a work site;
an adjustment unit configured to adjust at least one of (i) a quantity of the one or more drawings to be simultaneously projected by the projection device or (ii) a setting parameter regarding a mode of projection performed by the projection device; and
a determination unit configured to determine a projection sequence of the one or more drawings to be individually projected onto the work spots,
wherein the projection device projects the one or more drawings in the projection sequence determined by the determination unit.

2. The projection system according to claim 1,
wherein the adjustment unit adjusts the quantity of the one or more drawings to be simultaneously projected by the projection device, and
the projection device projects the one or more drawings of the quantity adjusted by the adjustment unit in the projection sequence determined by the determination unit.

3. The projection system according to claim 2,
wherein the determination unit determines, as the projection sequence, a sequence that produces a shortest route for a worker passing through each of the work spots once.

4. The projection system according to claim 1, further comprising:
a judgment unit configured to judge whether a drawing among the one or more drawings is projectable onto the work spots; and
a storage configured to store information indicating a work spot judged by the judgment unit to be a work spot onto which the drawing is unprojectable,
wherein the projection device stops projection of the drawing onto the work spot judged by the judgment unit to be a work spot onto which the drawing is unprojectable, and
when a location of the projection device is changed, the projection device resumes projection of the drawing onto the work spot for which projection of the drawing is stopped, based on the information stored in the storage.

5. The projection system according to claim 1,
wherein the adjustment unit adjusts the setting parameter, and
the setting parameter is at least one of (i) light intensity to be used for projection of the one or more drawings or (ii) a projection time interval for the one or more drawings.

6. A projection method comprising:
projecting, by a projection device including a laser scanner, one or more drawings individually onto work spots in a work site;
adjusting at least one of (i) a quantity of the one or more drawings to be simultaneously projected by the projection device or (ii) a setting parameter regarding a mode of projection performed by the projection device;
determining a projection sequence of the one or more drawings to be individually projected onto the work spots; and
projecting, by the projection device, the one or more drawings in the projection sequence.

7. A projection system comprising:
a projection device that includes a laser scanner and projects one or more drawings individually onto work spots in a work site;
an adjustment unit configured to adjust at least one of (i) a quantity of the one or more drawings to be simultaneously projected by the projection device or (ii) a setting parameter regarding a mode of projection performed by the projection device;
a judgment unit configured to judge whether a drawing among the one or more drawings is projectable onto the work spots; and
a storage configured to store information indicating a work spot judged by the judgment unit to be a work spot onto which the drawing is unprojectable,
wherein the projection device stops projection of the drawing onto the work spot judged by the judgment unit to be a work spot onto which the drawing is unprojectable, and
when a location of the projection device is changed, the projection device resumes projection of the drawing onto the work spot for which projection of the drawing is stopped, based on the information stored in the storage.

* * * * *